United States Patent
Vogel et al.

(10) Patent No.: US 6,246,728 B1
(45) Date of Patent: Jun. 12, 2001

(54) APPARATUS FOR SUPPRESSING INTERFERING DC COMPONENT SHIFTS IN A RADIO RECEIVER OF THE DIRECT CONVERSION TYPE, AND A CORRESPONDING METHOD SUPPRESSION

(75) Inventors: Hélène Vogel, Meylan; Michel Galligo, Paris, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/038,969

(22) Filed: Mar. 12, 1998

(30) Foreign Application Priority Data

Mar. 13, 1997 (FR) .................................................. 97 02992

(51) Int. Cl.[7] ....................................................... H03D 3/00
(52) U.S. Cl. ......................... 375/322; 375/152; 375/286; 375/340
(58) Field of Search ................................. 375/322, 340, 375/286, 152; 329/306; 335/34

(56) References Cited

U.S. PATENT DOCUMENTS

| | | | |
|---|---|---|---|
| 4,318,128 | 3/1982 | Sauvanet | 348/465 |
| 4,887,050 | * 12/1989 | Borth et al. | 331/34 |
| 5,311,544 | * 5/1994 | Park et al. | 375/152 |
| 5,442,655 | * 8/1995 | Dedic et al. | 375/340 |
| 5,883,548 | * 3/1999 | Assard et al. | 329/306 |

FOREIGN PATENT DOCUMENTS 2267629   12/1993   (GB) .

* cited by examiner

*Primary Examiner*—Stephen Chin
*Assistant Examiner*—Shuwang Liu
(74) *Attorney, Agent, or Firm*—Sughrue, Mion, Zinn, Macpeak & Seas, PLLC

(57) ABSTRACT

Apparatus for suppressing interfering DC component shifts affecting reception of a radio-frequency signal transmitted in signal elements referred to as "bursts", in particular for a receiver of the direct conversion type, and a corresponding method of suppression. The apparatus comprises a device for normalizing the power of the successively received bursts relative to the power of the resulting wanted signal, a device for determining value and position characteristics for the DC component shift for each received burst, each shift being assumed to have at least approximately the same time position relative to the burst that it degrades as the following shift relative to the following burst, and corrector for subtracting the shift characteristics determined for each burst from the baseband signal obtained after normalization. The invention is applicable to mobile radio terminals in digital cellular radio networks.

8 Claims, 3 Drawing Sheets

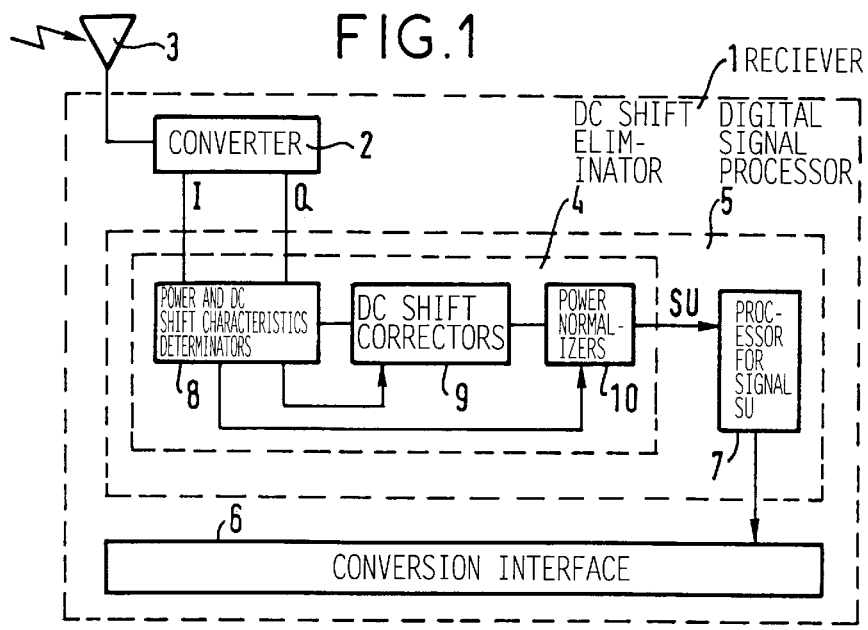
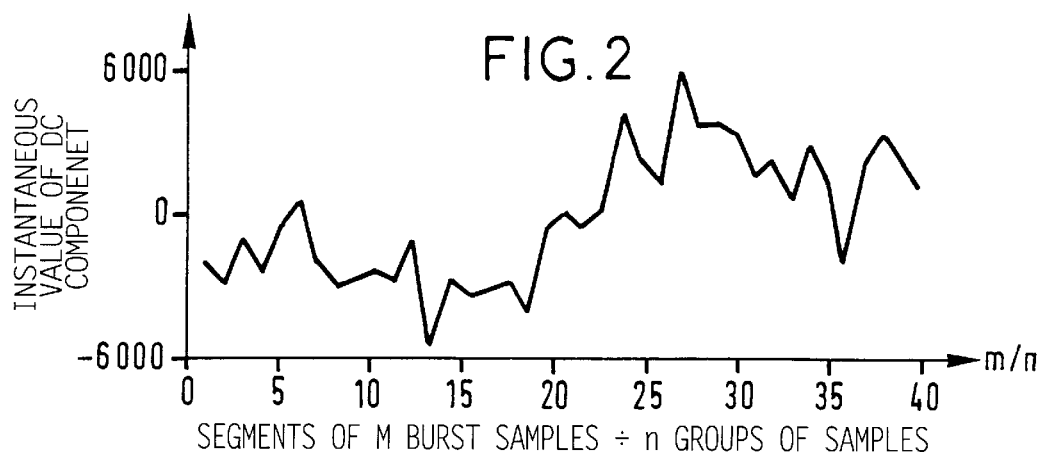
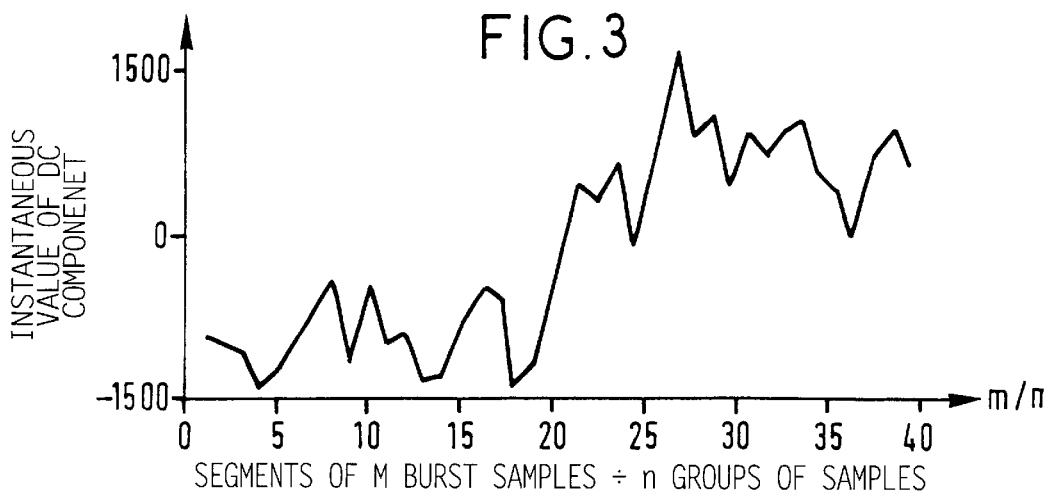

ing each of the components of the received signal, so as to enable said components to be corrected before they are used.

APPARATUS FOR SUPPRESSING INTERFERING DC COMPONENT SHIFTS IN A RADIO RECEIVER OF THE DIRECT CONVERSION TYPE, AND A CORRESPONDING METHOD SUPPRESSION

FIELD OF THE INVENTION

The invention relates to suppressor apparatus designed to protect radio receivers, and in particular direct conversion type radio receivers, against interfering DC component shifts that can affect the received signals, and to radio sets including such apparatus.

The invention is more particularly applicable to receivers used in digital cellular radio networks, and in which reception can be disturbed by DC component shifts caused by interference in bursts. The invention also relates to the suppression method implemented.

BACKGROUND OF THE INVENTION

It is possible to simplify radio receivers, and in particular radio receivers equipping radio-communications terminals in mobile radiotelephone networks, by not using an intermediate frequency in the receivers and by going directly from the received radio-frequency signal to a baseband signal. It is then possible to omit the elements of the receiver that involve using an intermediate frequency.

One solution for avoiding use of an intermediate frequency is mentioned in the preamble of Document EP-A-0 474 615. That solution consists of retrieving the wanted signal contained in the received signal whose carrier is a signal of the f=Acosωt+φ (type, by using the results of multiplying the received signal by a local cosωt signal, and the results of multiplying said received signal by a local sinωt signal, where ω has the same value for the received signal and for both local signals.

The results of those two multiplications correspond respectively to an in-phase signal element I and to a quadrature signal element Q, each of which comprises difference components that are in the vicinity of zero frequency, and sum components that are in the vicinity of twice the frequency of the carrier of the received signal. A low-pass filter makes it possible to retain only the difference components, also referred to as "zero frequency" components, of the I and Q signal elements to obtain the wanted portion of the received signal.

One of the problems that arises with receivers using that technique is that interfering transmissions can create DC component shifts in baseband that degrade the wanted signal obtained at the outlet of a receiver, which wanted signal can be received at a power level that is much lower than the power of the interfering DC component.

That can apply to digital cellular radio networks of the GSM type, when a noise source disturbs reception in a terminal by adding a DC component shift or offset to the wanted signal that the terminal is to receive, in particular if the noise-source operates in bursts, i.e. it transmits on a carrier that it time-shares, as is conventional in time-division multiple access mobile radio networks. In which case, the DC component shift does not necessarily disturb the entire received signal, and it acts differently on the in-phase component I and on the quadrature component Q of the received signal.

To demodulate the received signal correctly, it is necessary to take that problem into account, and in particular to determine the characteristics of the interfering shifts affect-

OBJECTS AND SUMMARY OF THE INVENTION

The invention therefore provides apparatus for suppressing interfering DC component shifts affecting reception of a transmitted radio-frequency signal that is time-division multiplexed in the form of a succession of signal elements referred to as "bursts", each of which is made up of the same number "m" of samples.

According to a characteristic of the invention as shown in FIGS. 1 and 1A, the apparatus comprises means 10 for normalizing the power of the successively received bursts relative to the power of the resulting wanted signal, means 8, 8a for determining the instantaneous value of the DC component for burst segments comprising the same integer number m/n of samples in the same burst, and mean values per segment that are obtained cumulatively on the basis of successive bursts, means 8b for determining value and position characteristics for the DC component shift for each received burst, by computing on the basis of the mean values and instantaneous values per segment, each shift being assumed to have at least approximately the same time position relative to the burst that it degrades as the following shift relative to the following burst, and corrector means 9 for subtracting the shift characteristics determined for each burst from the baseband signal obtained after normalization.

According to a characteristic of the invention, the apparatus includes means 8c for determining the instantaneous DC component value for the in-phase component I and the quadrature component Q at zero frequency from a received radio signal, and means 8d for determining a cumulative mean value per component segment of a received burst, firstly for the in-phase component and secondly for the quadrature component, by summing the instantaneous value obtained for said segment, as weighted by a measurement contribution factor, with the cumulative value obtained for the preceding received burst for the same signal, as weighted by a forgetting factor, the sum of the forgetting factor and the measurement contribution factor being equal to one.

According to a characteristic of the invention, the apparatus includes means for determining a DC component shift position that is accurate to within one bit for each received burst on the basis of the DC component values before and after a transition caused by a DC component shift, in the in-phase component or in the quadrature component of a burst, which values have been determined for the segment to which the minimum error for said burst corresponds, and on the basis of an intermediate value corresponding to the DC component shift determined for the "n" bits of the minimum error segment.

According to a characteristic of the invention, the apparatus includes corrector means taking into account the differences between the DC component values "dch" & "dcb", and between the DC component values "dcqh" & "dcqb", as determined for a burst for suppressing the interfering shift DC components that affect the in-phase component and the quadrature component of said burst, on the basis of the shift position, to within one bit, as determined for said burst.

The invention also provides a radio receiver of the direct conversion type delivering two baseband components, namely an in-phase component I and a quadrature component Q, on the basis of a received radio-frequency signal, the receiver being more particularly designed to receive a transmitted signal that is time-division multiplexed in the form of a succession of signal elements referred to as "bursts", each of which is made up of the same number "m" of samples.

According to a characteristic of the invention, the receiver includes apparatus as defined above for suppressing interfering DC component shifts, which apparatus contained at least in part in a digital signal processor and downstream from a radio converter stage delivering the in-phase component I and the quadrature component Q of a baseband signal on the basis of a radio-frequency signal received by the receiver.

The invention further provides a method of suppressing interfering DC component shifts affecting reception of a transmitted radio-frequency signal that is time-division multiplexed in the form of a succession of signal elements referred to as "bursts", each of which is made up of the same number "m" of samples.

According to a characteristic of the invention, the method comprises:
- at least one normalization step in which the power of the successively received bursts is normalized relative to the power of the resulting wanted signal;
- a step in which the instantaneous value of the DC component is determined for burst segments that comprise the same integer number m/n of samples in the same burst, and mean values are determined per segment that are obtained cumulatively on the basis of successive bursts;
- a step in which value and position characteristics are determined for the DC component shift for each received burst, by computing on the basis of the mean values and instantaneous values per segment, each shift being assumed to have at least approximately the same time position relative to the burst that it degrades as the following shift relative to the following burst; and
- a step in which the signal is corrected by subtracting the shift characteristics determined for each burst from the baseband signal obtained after normalization.

BRIEF DESCRIPTION OF THE DRAWINGS

The invention, its characteristics and advantages are explained in more detail in the following description given with reference to the following figures:

FIG. 1 is a block diagram showing the principle of apparatus making it possible to implement the method of the invention in a receiver of the direct conversion type;

FIG. 2 is a graph showing an example of the distribution of the instantaneous DC component values "dci_inst" for the ""m/n" segments of a burst;

FIGS. 3 and 4 are graphs showing the distribution of the DC component value estimates "tds_dci" obtained for the "m/n" segments of a burst after taking account of a plurality "z1" or "z2" of successive bursts in the same signal.

MORE DETAILED DESCRIPTION

Figure 1A:
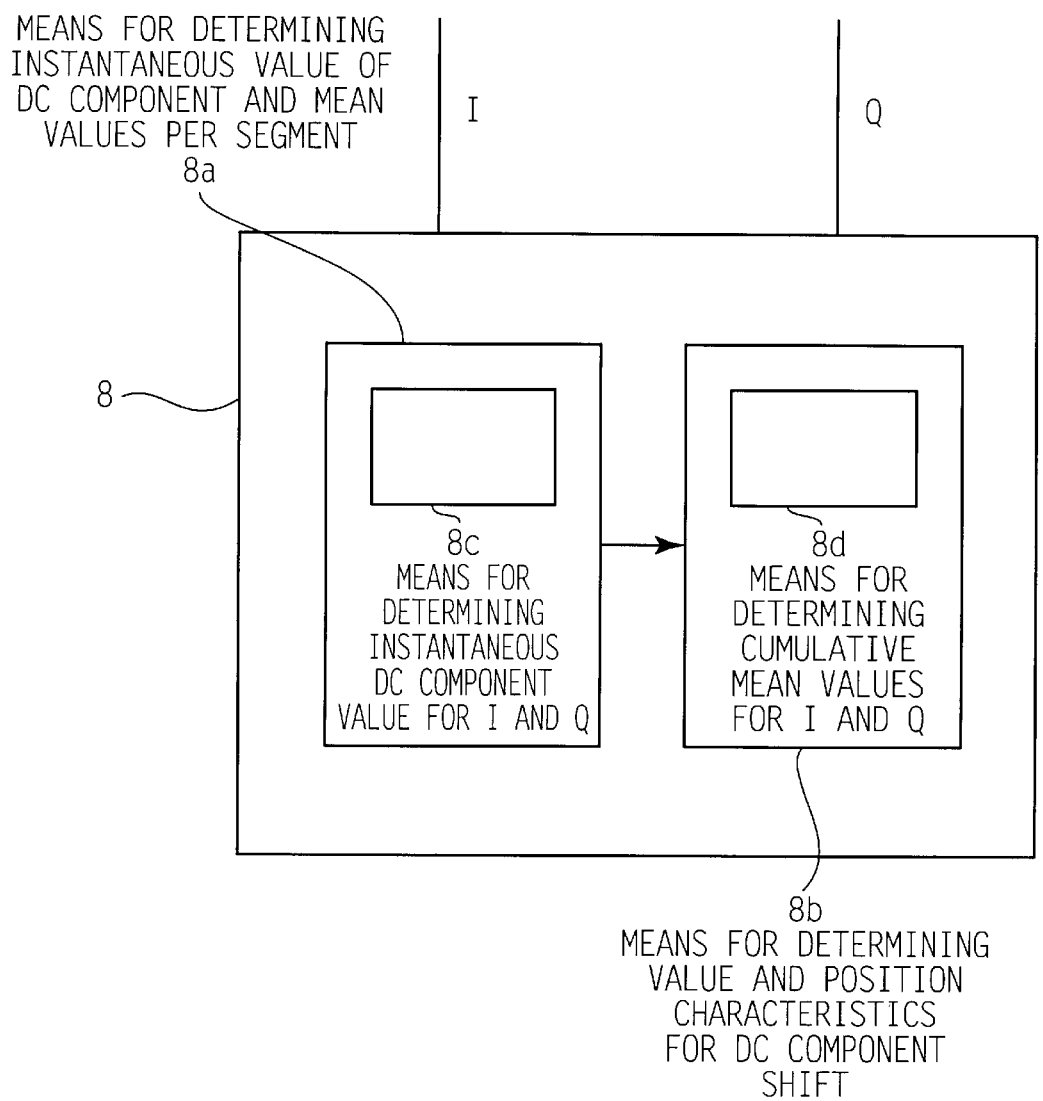
FIG. 1A shows internal components of block 8 of FIG. 1.

The receiver 1 shown diagrammatically in FIG. 1 is assumed to be of the direct conversion type. For example, it may be included in a transceiver set (not shown), such as, for example, a mobile radio terminal of a digital cellular radio network of the GSM type. The receiver 1 is assumed to be provided with a converter stage 2 which receives the radio signals picked up by an antenna 3 and which extracts therefrom the I and Q baseband components of a raw signal, as mentioned above.

These components are delivered to elimination apparatus 4 of the invention for eliminating DC component shift. For example, this apparatus may be contained in a digital signal processor 5 for processing the in-phase and quadrature components of the raw signal so as to extract the wanted information therefrom. Alternatively, it may be positioned at least in part upstream from such a digital signal processor.

The extracted information is delivered to an interface 6 making it possible to put said information in the appropriate form before it is applied either to information processing members or to transducer members, which members (not shown) are integrated in or connected to the receiver.

To this end, the digital signal processor 5 includes at least one apparatus 7 making it possible to process a wanted signal SU delivered by the elimination apparatus 4 of the invention from the raw I and Q signal components that it receives from the converter stage 2 of the receiver for the purposes of applying them to the interface 6.

The apparatus 7 is made up of hardware and/or software elements as is the elimination apparatus 4. It is not described in greater detail and nor is the conversion interface 6 insofar as both are only indirectly related to the present invention.

The elimination apparatus 4 includes a set of means or devices 8 serving to determine the characteristics of the interfering shift affecting the I and Q components of a received wanted signal, and to determine the power of said received signal. It also includes a set of shift correction means or devices 9 which are servo-controlled to the means for determining the characteristics of the shift. It further includes a set of power normalization means or devices 10 which are controlled, in particular, by the power determination means, and which act on the I and Q components of the received signal that is applied to them by the shift correction means 9 after they have been evaluated by the determination means 8.

The means 8 take into account the in-phase component I and the quadrature component Q that are produced by the converter stage 2 on the basis of the signal bursts or elements that are transmitted successively by radio, in order to determine the characteristics of the interfering shifts affecting a received radio signal.

One of these characteristics that the apparatus of the invention aims to determine is the position "pos" of each shift relative to the burst in which it occurs.

Two other characteristics that are also determined are the two residual DC values obtained respectively for the in-phase component I and for the quadrature component Q of the received signal, one value from the beginning of a burst until a shift, and the other value from the shift until the end of the burst, i.e., graphically, one to the left and the other to the right of the shift.

Figure 4:
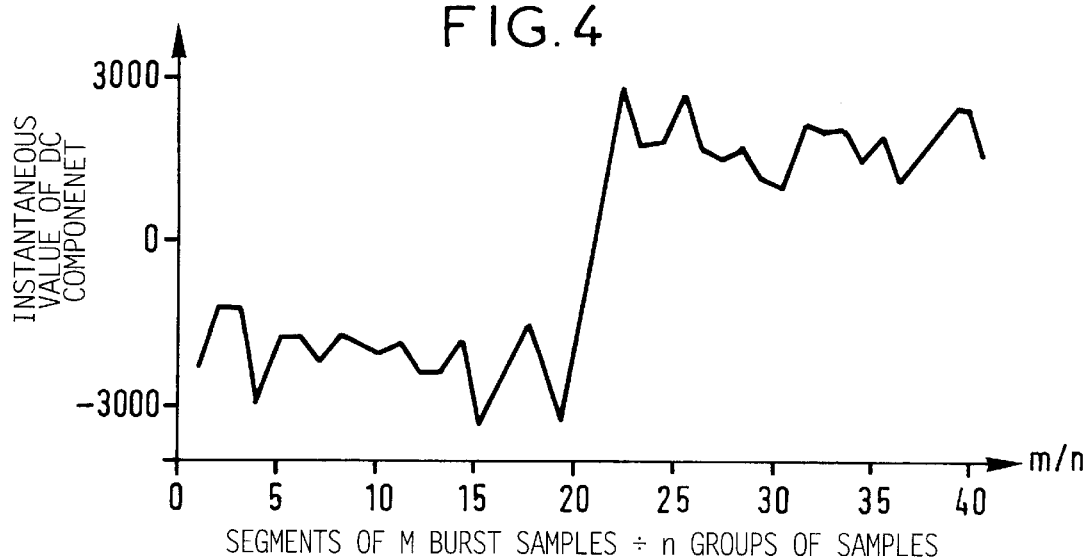

FIG. 4 shows an example of the appearance of a burst during which an interfering voltage shift appears, such as the shift caused by a burst of interference.

The DC component values for a received burst are estimated by summing the "$\underline{m}$" successive samples of the burst, in groups of "$\underline{n}$" where $\underline{n}$ is, for example, chosen to be equal to 4 when each burst is made of m=156 samples, the value shown up the y-axis being arbitrary in this example. Each burst is thus represented by "m/n" DC component values "dci", each of which is determined for one of the successive segments of "n" bits of the burst, as shown by the graph in FIG. 2, for example. Because of the noise present, it is not possible for the results obtained to be used directly, as can be deduced clearly from FIG. 2. In the type of application considered, the positions and the amplitudes of the DC component shifts relative to the bursts that they degrade varies only very slowly relative to the frame rate at which the signal elements are transmitted.

As a result, provision is made to use a cumulative DC component value for the segments having the same rank in a succession of successively received bursts for the same signal. This involves storing in a memory the DC component values "dci" obtained for each of the determined segments for a succession of a given number of bursts of the signal. The value obtained cumulatively for each segment of rank "k" among the m/n determined segments per burst is expressed in this case in the following form (1):

$$tds\_dci(k) = A*tds\_dci'(k) + B*dci\_inst(k)$$

where the most recent estimate "tds_dci" for a given segment is obtained from the cumulative estimate determined previously for the same segment and from the instantaneous value "dci_inst" most recently obtained for said segment.

"A" is a forgetting factor and B is a measurement contribution factor. These factors A and B are chosen such that their sum is equal to 1, with, for example, A=0.9 and B=0.1.

This makes it possible to establish a table T of DC component values for the set of "m/n" burst segments in which there is a stabilization of the DC component "dci" obtained cumulatively for each segment.

Two examples of such stabilization are shown in FIGS. 3 and 4 which are graphs showing the results respectively obtained after taking into account a number "z1" of ten then a number "z2" of fifty successive bursts of a signal disturbed by a burst of interference. The position of the DC component shift created by the interference appears on these graphs with accuracy that increases with the number of bursts of the received signal that are taken into account.

The position "pos" of the DC component shift is estimated from the above-defined Table T by estimating the least squares error between the shift estimate obtained for a segment by the formula relative to the value "tds_dci" as described above, and the estimates obtained for the m/n possible shift positions in a burst. For this purpose, two evaluations are performed on the basis of the following values:

$$dcb = \frac{\sum_{i=1}^{pos-1} tds\_dci(i)}{pos-1} \qquad dch = \frac{\sum_{i=pos}^{m/n} tds\_dci(i)}{(m/n) - pos}$$

The value "dcb" corresponds to the DC component value observed in a burst prior to the appearance of a transition caused by a DC component shift in said burst.

The value "dch" corresponds to the DC component value observed in a burst after the appearance of the transition in said burst. The least squares error is obtained by applying the following formula:

$$Er = \sum_{i=1}^{pos-1} (tds\_dci(i) - dcb)^2 + \sum_{i=pos}^{m/n} (tds\_dci(i) - dch)^2$$

The position value "pos" chosen for each burst is the value for which the error is at a minimum, i.e. the value which is closest to the cumulative value "tds_dci".

Figure 5:
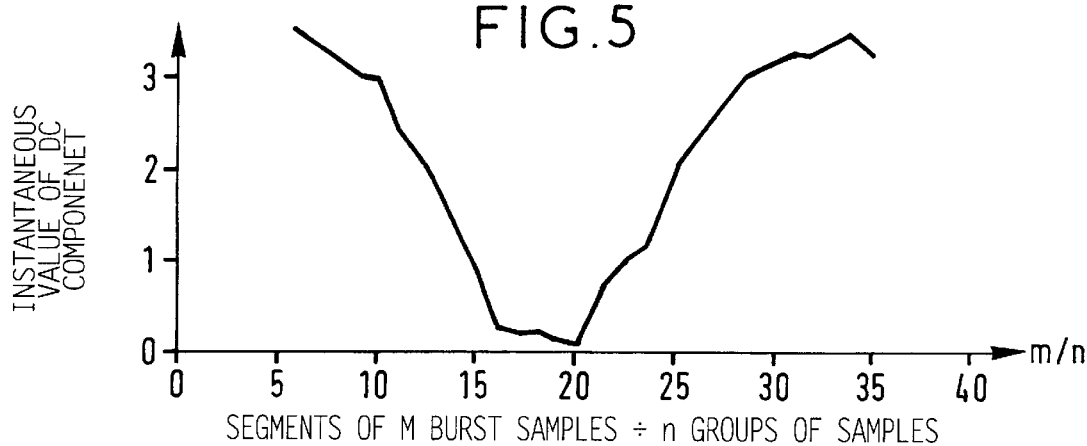
FIGS. 5 and 6 show examples of the distribution of the least squares error obtained for the "m/n" segments of a burst after taking into account "z1" or "z2" successive elements of the same signal.
Figure 6:
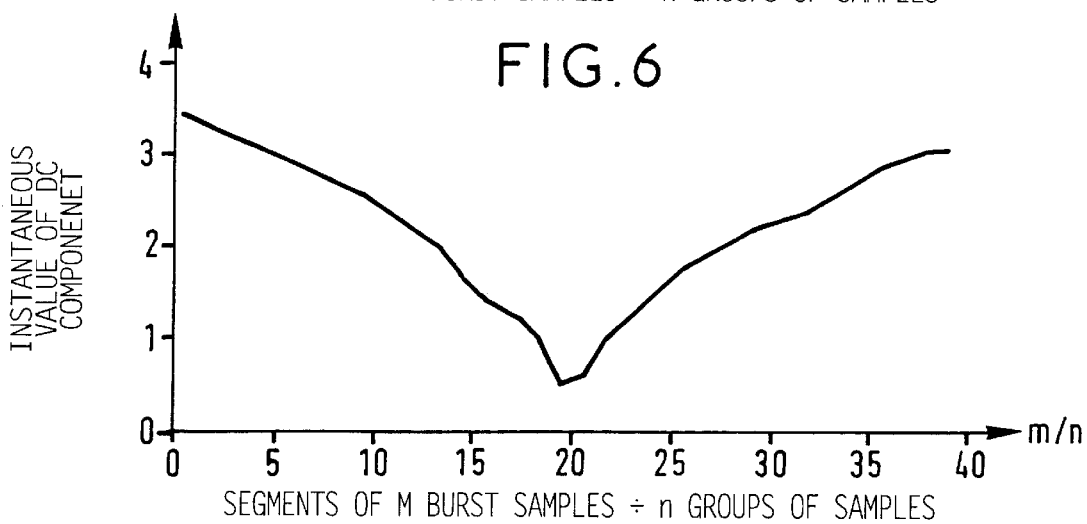

The graphs in FIGS. 5 and 6 show the results respectively obtained for position estimates from the initialization of the processing algorithm respectively for the ten and for the fifty successive signal bursts already taken into account for the operations whose results are shown in FIGS. 3 and 4.

The exact position of the DC component shift to within one bit position is then estimated for the selected segment of "n" bits. This estimation is performed on the basis of the values "dcb" and "dch", and of an intermediate value "dci_int" corresponding to the DC component shift for the "n" bits of the chosen segment, the intermediate value being given by the following formula:

$$dci\_int = \Delta\_pos * dcb + (n - \Delta\_pos) * dch$$

where "$\Delta\_pos$" corresponds to the difference between the fine position and the coarse position for one of "n" bits positions of the segment, i.e.

$$\Delta\_pos = (dc\_int - dch)/(dcb - dch)$$

Knowing the factor "pos" makes it possible to define that position in a current burst from which the correction must take place, and knowing the factors "dcb" and "dch" makes it possible merely by taking the difference to establish the value of the correction to be performed on the component taken into account in the above-mentioned operations. In the above description, this component is assumed to be the in-phase component I of the signal.

In a first variant of the invention, the correction to be performed for the other component of the received signal, i.e., in this example, the quadrature component Q, is performed in the manner mentioned above for the in-phase component I.

In a cheaper second variant, the correction to be performed for one of the components, namely the quadrature component Q, or optionally the in-phase component I, may take into account the position "pos" already determined for the other component.

In the above-considered case in which the position "pos" has been determined for the in-phase component I, provision is made to compute the values "dcqb" and "dcqh" relating to the quadrature component Q in the same way as for the values corresponding to "dcb" and "dch" relating to the in-phase component I, and therefore using the following formulae:

$$dcqb = \frac{\sum_{i=1}^{pos-1} tds\_dci(q)}{pos-1} \qquad dcqh = \frac{\sum_{i=pos}^{m/n} tds\_dci(q)}{(m/n) - pos}$$

The two values leading to the correction to be applied are estimated by averaging the DC component shift values over a plurality of successive bursts of the received signal.

The two mean values dcqb_mem (burst p) and dcqh_mem (burst p) are computed similarly as indicated below for a burst "p" as a function of the value taken into account for the immediately preceding received burst and of the instantaneous value obtained for the current burst.

Hence:

$$dcqb\_mem(burst\ p) = A*dcqb\_mem(burst\ p-1) + B*dcqb\_inst$$

and:

$$dcqh\_mem(burst\ p) = A*dcqh\_mem(burst\ p-1) + B*dcqh\_inst$$

In this example, the forgetting factor A and the measurement contribution factor B are assumed to be identical to those defined above. The value set for the forgetting factor makes it possible to act on the speed of convergence of the algorithm implemented and on its stability and thus on the smoothing that it performs on the measurement results.

Knowing the values dcqb_mem (burst p) and dcqh_mem (burst p) makes it possible by taking the difference to determine the correction to be performed on the signal bursts, or more precisely on the quadrature component Q of the received signal from the position "pos" defined as indicated above.

The value set for the forgetting factor makes it possible to act on the speed of convergence of the algorithm implemented and on its stability and thus on the smoothing that it performs on the measurement results. The bit error rate (BER) becomes substantially zero very rapidly, and, for example, it goes from 50% to 1% after about twenty successive bursts have been received.

Provision is also made to perform a second normalization, burst by burst, on the in-phase component and on the quadrature component of the received signal after these components have been corrected in the manner indicated above.

This makes it possible to improve the quality of demodulation of the signal received by a receiver, in particular when a DC component shift is present that is of amplitude that is large relative to the amplitude of the received wanted signal. The automatic gain control of the receiver is organized to use the results of the determination of the energy of the wanted signal in the received signal, determined as indicated above.

What is claimed is:

1. An apparatus for suppressing interfering DC component shifts affecting reception of a transmitted radio-frequency signal that is time-division multiplexed in the form of a succession of signal elements referred to as "bursts", each of which is made up of the same number "m" of samples, said apparatus comprising means for normalizing the power of the successively received bursts relative to the power of a resulting wanted signal, means for determining the instantaneous value of the DC component for burst segments, in groups of n, comprising the same integer number m/n of samples in the same burst, and for detecting mean values per segment that are obtained cumulatively on the basis of successive bursts, and means for determining value and position characteristics for the DC component shift for each received burst, by computing on the basis of the mean values and instantaneous values per segment, each shift being assumed to have at least approximately the same time position relative to the burst that it degrades as the following shift relative to the following burst, and corrector means for subtracting the shift characteristics determined for each burst from the baseband signal obtained after normalization.

2. The apparatus according to claim 1, including means for determining an instantaneous DC component value for an in-phase component I and an quadrature component Q at zero frequency from a received radio signal, and means for determining a cumulative mean value per component segment of a received burst, firstly for the in-phase component and secondly for the quadrature component, by summing the instantaneous values obtained for said component segment, as weighted by a measurement contribution factor, with the cumulative value, obtained for the preceding received burst for the same signal, as weighted by a forgetting factor, the sum of the forgetting factor and the measurement contribution factor being equal to one.

3. The apparatus according to claim 2, including computing means for determining characteristics of DC component values for each received burst, by computing on the basis of the mean values and instantaneous values per burst segment, which computing means include first means for determining a DC component value "dcb" or "dcqb" prior to appearance of a transition caused by a DC component shift in a burst, and a DC component value "dch" or "dcqh" after appearance of the transition in the same burst, wherein $$dcb = \frac{\sum_{i=1}^{pos-1} tds\_dci(i)}{pos - 1} \qquad dch = \frac{\sum_{i=pos}^{m/n} tds\_dci(i)}{-pos}$$

for the in-phase component I of the received signal; and $$dcqb = \frac{\sum_{i=1}^{pos-1} tds\_dci(q)}{pos - 1} \qquad dcqh = \frac{\sum_{i=pos}^{m/n} tds\_dci(q)}{-pos}$$

for the phase quadrature component Q of said received signal, where tds_dci is a cumulative DC component value, and "pos" is the position of each shift relative to the burst in which it occurs.

4. The apparatus according to claim 3, including means for determining a position of the DC component shift for each received burst by taking into account a minimum error determined for a segment of the burst in the in-phase component or in the quadrature component, on the basis of an estimate of the least squares error for each segment of the burst for the chosen component, i.e. the in-phase component or the quadrature component.

5. The apparatus according to claim 4, including means for determining a DC component shift position that is accurate to within one bit for each received burst on the basis of the DC component values before and after a transition caused by a DC component shift, in the in-phase component or in the quadrature component of a burst, which values have been determined for the segment to which the minimum error for said burst corresponds, and on the basis of an intermediate value corresponding to the DC component shift determined for "n" bits of the minimum error determined for said segment.

6. The apparatus according to claim 5, including corrector means taking into account the differences between the DC component values "dch" & "dcb", and between the DC component values "dcqh" & dcqb", as determined for said burst for suppressing the interfering shift DC components that affect the in-phase component and the quadrature component of said burst, on the basis of the shift position, to within one bit, as determined for said burst.

7. A radio receiver of the direct conversion type delivering in a downstream direction two baseband components, namely an in-phase component I and a quadrature component Q, on the basis of a received radio-frequency signal, the receiver being designed to receive a transmitted signal that is time-division multiplexed in the form of a succession of signal elements referred to as "bursts", each of which is made up of the same number "m" of samples, said receiver including apparatus according to claim 1 for suppressing the interfering DC component shifts, which apparatus is contained at least in part in, or upstream from, a digital signal processor and downstream from a radio converter stage delivering the in-phase component I and the quadrature component Q of a baseband signal on the basis of a radio-frequency signal received by the receiver.

8. A method of suppressing interfering DC component shifts affecting reception of a transmitted radio-frequency signal that is time-division multiplexed in the form of a succession of signal elements referred to as "bursts", each of which is made up of a same number "m" of samples, said method comprising:

at least one normalization step in which the power of successively received bursts is normalized relative to the power of a resulting wanted signal;

a step in which an instantaneous value of the DC component is determined for burst segments, in groups of n, that comprise a same integer number m/n of samples in a same burst, and mean values are determined per segment that are obtained cumulatively on the basis of successive bursts;

a step in which value and position characteristics are determined for the DC component shift for each received burst, by computing on the basis of the mean values and instantaneous values per segment, each shift being assumed to have at least approximately the same time position relative to the burst that it degrades as the following shift relative to the following burst; and a step in which the signal is corrected by subtracting shift characteristics determined for each burst from the baseband signal obtained after normalization.

* * * * *